(12) United States Patent
Bendersky et al.

(10) Patent No.: US 11,316,842 B2
(45) Date of Patent: Apr. 26, 2022

(54) IDENTITY VERIFICATION BASED ON ELECTRONIC FILE FINGERPRINTING DATA

(71) Applicant: CyberArk Software Ltd., Petach-Tikva (IL)

(72) Inventors: Arthur Bendersky, Tel Aviv (IL); Hadas Elkabir, Hod Hasharon (IL); Tal Zigman, Petach-Tikva (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 16/601,730

(22) Filed: Oct. 15, 2019

(65) Prior Publication Data

US 2021/0029100 A1   Jan. 28, 2021

Related U.S. Application Data

(63) Continuation-in-part of application No. 16/520,247, filed on Jul. 23, 2019.

(51) Int. Cl.
*H04L 29/06* (2006.01)
*G06F 16/24* (2019.01)

(52) U.S. Cl.
CPC .............. *H04L 63/08* (2013.01); *G06F 16/24* (2019.01)

(58) Field of Classification Search
CPC ........... G06F 21/44; G06F 16/24; H04L 63/08
See application file for complete search history.

(56) References Cited

U.S. PATENT DOCUMENTS

| 2007/0106895 | A1 | 5/2007 | Huang et al. |
| 2012/0070029 | A1* | 3/2012 | Muriello ................. G06F 21/44 |
| | | | 382/100 |
| 2017/0264599 | A1 | 9/2017 | O'Regan et al. |
| 2020/0076877 | A1* | 3/2020 | Stringham .......... G06F 21/6218 |

OTHER PUBLICATIONS

Communication and Extended European Search Report dated Dec. 9, 2019, issued from the European Patent Office in corresponding Application No. 19193771.3-1218 (9 pages).
Feng Hao et al., Combining cryptography with biometrics effectively, https://pdfs.semanticscholar.org/ac75/619b8566df1f9580c38ba745c463023146d2.pdf (Jul. 2005) (17 pages).

(Continued)

*Primary Examiner* — Brian F Shaw
(74) *Attorney, Agent, or Firm* — Finnegan, Henderson, Farabow, Garrett & Dunner, LLP

(57) ABSTRACT

Disclosed embodiments relate to uniquely identifying and validating identities based on electronic file fingerprints. Techniques include identifying an identity associated with a computing device; accessing fingerprinting data associated with an electronic file stored on or transmitted from the computing device; generating, based on a diversity of different properties of the fingerprinting data, a profile for the electronic file; accessing a repository storing profiles corresponding to a plurality of identities; comparing the generated profile with one or more of the stored profiles; determining whether the generated profile matches a stored profile, from the repository of stored profiles, associated with the identity; and validating, conditional on the matching, the identity.

19 Claims, 7 Drawing Sheets

(56) References Cited

OTHER PUBLICATIONS

Mauro Barni et al., Privacy-Preserving Fingercode Authentication, http://piurilabs.di.unimi.it/Papers/awmm_2010.pdf (Sep. 9-10, 2010) (11 pages).

T. Charles Clancy et al., Secure Smartphone-Based Fingerprint Authentication, http://home.eng.iastate.edu/~daniels/cpre531/handouts/biom.pdf (Nov. 8, 2003) (10 pages).

Agilent Technologies, How Normalizing Biological Data Works, https://www.labmanager.com/how-it-works/2018/09/how-normalizing-biological-data-works#.XTdOVuhKhPZ (Sep. 12, 2018) (3 pages).

Paul Schnell, What is Application DNA and why should you care?, Citrix Blogs, https://www.citrix.com/blogs/2012/03/19/what-is-application-dna-and-why-should-you-care/ (Mar. 19, 2012) (9 pages).

Fingerprinting: Identifying Applications, Infosec, https://resources.infosecinstitute.com/finger-printing-print-the-finger-of-an-application/#gref (May 11, 2015) (14 pages).

\* cited by examiner

IDENTITY VERIFICATION BASED ON ELECTRONIC FILE FINGERPRINTING DATA

CROSS-REFERENCE TO RELATED APPLICATIONS

This application is a continuation-in-part of U.S. application Ser. No. 16/520,247, titled "Verification of Client Identities Based on Non-Distributed Data," filed Jul. 23, 2019, the benefit of priority to which is claimed by the present application.

BACKGROUND

Many resources require a user to log in by providing a username and password to a server system that compares the provided credentials against a set of valid credentials stored and maintained by the server system. However, this leaves large numbers of users vulnerable when the server system is compromised and credential data is stolen. For example, a malicious user may obtain stored account information of thousands of users by accessing a credentials database in a single attack.

Further, users do not have control over the security measures, if any, taken by an entity storing user information. Users entrust the storage of sensitive information (e.g., personal data, financial data, medical data, etc.) and credentials to entities without knowing the vulnerabilities of the entities' systems. If this information is shared with other entities, the security of the information is further jeopardized.

Multifactor authentication has improved the security of sensitive resources by requiring a user to log in to an entity's system using more than one method. For example, a user may be required to provide a valid username and password, as well as biometric information, a one-time randomly generated code, an answer to a security question, etc. However, these methods of authentication still rely on the authenticating entity to store and maintain a user's credentials and information.

Further, some authentication processes involve users taking images of themselves (e.g., for an administrator or other security personnel to visually verify the user). But these techniques are also insecure and inefficient. For example, attackers may obtain a copy of a legitimate user's image (e.g., from a social media photo, company directory, etc.) and use it to impersonate the legitimate user. Some users, moreover, refuse to take pictures of themselves, and instead take pictures of their surroundings, which can result in an administrator denying access to the user. Administrators also have difficulty managing large amounts of user images, and have inherent challenges with visually recognizing large numbers of users (e.g., employees, contractors, visitors, etc.).

There are thus technological needs for systems and methods for verifying a user's identity without exposing the user's information to an entity's systems. This would be advantageous in preventing malicious actors from obtaining user credentials or other sensitive data by attacking an entity system or resource. Further, the extent of a breach of an entity's systems would be mitigated, as the attacker would not obtain the credentials or sensitive data associated with the users of the entity's services or systems. Additionally, such passwordless and credentialless techniques would be advantageous if they could rely on strongly unique data that identifies users without requiring users to carry inconvenient devices (e.g., fobs, RSA™ devices, etc.) or engage in cumbersome authentication practices. Advantageously, techniques could rely on devices that users already carry (e.g., personal computing devices such as smartphones, tablets, wearable devices, computer-enabled jewelry, etc.) and electronic files that such devices are configured to generate (e.g., images, videos, sounds, textual documents, etc.). By reducing burdens on users while maintaining effectiveness in identifying users, compliance and overall security will increase.

SUMMARY

The disclosed embodiments describe systems and methods for verifying identities based on identity-inherent data that is inaccessible to the system. For example, in an exemplary embodiment, there may be a system including a memory storing software instructions and a hardware-based processor configured to execute the software instructions to perform operations for verifying identities based on identity-inherent data that is inaccessible to the system. The operations may comprise receiving, from a client, an encrypted token, the encrypted token having been encrypted at the client using a cryptographic key created at the client based on identity-inherent data of an identity of the client; wherein the identity-inherent data of the identity is not itself received by the system, and wherein the cryptographic key is accessible only to the client; and storing the encrypted token in association with a hash of a decrypted version of the encrypted token to allow for comparing the stored hash with a created hash and determining whether to verify the identity based on a result of the comparing.

According to a disclosed embodiment, the operations further comprise computing the stored hash and the created hash.

According to a disclosed embodiment, the operations further comprise: transmitting the encrypted token to the client; receiving from the client a client-decrypted version of the encrypted token, the client-decrypted version of the encrypted token having been decrypted by the client using the cryptographic key based on identity-inherent data of the identity of the client; and computing, based on the received client-decrypted version of the encrypted token, the created hash.

According to a disclosed embodiment, the identity-inherent data of the identity is at least one of: biometric data, biological data, personal verification data, or signature data associated with a human user or application.

According to a disclosed embodiment, the operations further comprise transmitting an encryption key to the client.

According to a disclosed embodiment, the client is configured to encrypt, using the transmitted encryption key, at least one of: a client-decrypted version of the encrypted token or a client-computed hash based on the client-decrypted version of the encrypted token.

According to a disclosed embodiment, the operations further comprise decrypting, using a key corresponding to the transmitted encryption key, the at least one of: the client-decrypted version of the encrypted token or the client-computed hash.

According to a disclosed embodiment, the transmitted encryption key is a public key and the key corresponding to the transmitted encryption key is a private key.

According to a disclosed embodiment, the receiving of the encrypted token from the client is part of a registration process for the client.

According to a disclosed embodiment, the operations further comprise transmitting the encrypted token to the client in response to a request from the client for access to a secure resource requiring authentication.

According to another disclosed embodiment, a method may be implemented for verifying an identity based on identity-inherent data that a client does not share externally. The method may comprise: transmitting, from the client to a system, an encrypted token, the encrypted token having been encrypted at the client using a cryptographic key created at the client based on identity-inherent data of an identity of the client; wherein the identity-inherent data of the identity is not itself transmitted to the system, and wherein the cryptographic key is accessible only to the client; and transmitting, from the client to the system, at least one of: a client-decrypted version of the encrypted token, or a client-created hash based on the client-decrypted version of the encrypted token; wherein the system is configured to, as part of a verification process for the identity, compare a stored hash with at least one of: a system-computed hash based on the client-decrypted version of the encrypted token, or the client-created hash.

According to another disclosed embodiment, the method further comprises receiving the encrypted token from the system as part of the verification process.

According to another disclosed embodiment, the method further comprises receiving, from the system, an encryption key.

According to another disclosed embodiment, the method further comprises encrypting, using the encryption key, at least one of: the client-decrypted version of the encrypted token, or the client-created hash.

According to another disclosed embodiment, the method further comprises, upon the system successfully verifying the identity, obtaining access to a secure resource requiring verification of the identity.

According to another disclosed embodiment, the method further comprises generating the encrypted token by generating a token and encrypting the token using the cryptographic key based on identity-inherent data of the identity.

According to another disclosed embodiment, the token is at least one of a random number or a universally unique identifier.

According to another disclosed embodiment, the method further comprises computing the client-created hash based on the client-decrypted version of the encrypted token.

According to another disclosed embodiment, the identity-inherent data of the identity is at least one of: biometric data, biological data, personal verification data, or signature data associated with a human user or application.

According to another disclosed embodiment, the cryptographic key based on identity-inherent data of the identity is a symmetric cryptographic key.

Additional disclosed embodiments describe systems and methods for uniquely identifying and validating identities based on electronic file fingerprints. For example, in an exemplary embodiment, there may be a system including a memory storing software instructions and a hardware-based processor configured to execute the software instructions to perform operations for uniquely identifying and validating identities based on electronic file fingerprints. The operations may comprise identifying an identity associated with a computing device; accessing fingerprinting data associated with an electronic file stored on or transmitted from the computing device; generating, based on a diversity of different properties of the fingerprinting data, a profile for the electronic file; accessing a repository storing profiles corresponding to a plurality of identities; comparing the generated profile with one or more of the stored profiles; determining whether the generated profile matches a stored profile, from the repository of stored profiles, associated with the identity; and validating, conditional on the matching, the identity.

According to another disclosed embodiment, the validating includes granting the identity access to a secure resource.

According to another disclosed embodiment, the identity is at least one of: a unique computing device, a unique user, or an account.

According to another disclosed embodiment, the electronic file is an image file and the fingerprinting data comprises image metadata.

According to another disclosed embodiment, the image file is an image of a user associated with the identity.

According to another disclosed embodiment, the diversity of different properties of the fingerprinting data include at least one of: date data, device data, zoom data, software data, or location data.

According to another disclosed embodiment, the identity provides the electronic file as part of requesting access to a secure resource.

According to another disclosed embodiment, generating the profile for the electronic file includes generating a unique fingerprint for the electronic file that is computationally based on the diversity of different properties of the fingerprinting data.

According to another disclosed embodiment, the validating includes authenticating the identity.

According to another disclosed embodiment, the validating includes provisioning a credential for use by the identity in accessing a secure resource.

Further disclosed embodiments include a computer-implemented method for uniquely identifying and validating identities based on electronic file fingerprints. The method may comprise identifying an identity associated with a computing device; accessing fingerprinting data associated with an electronic file stored on or transmitted from the computing device; generating, based on a diversity of different properties of the fingerprinting data, a profile for the electronic file; accessing a repository storing profiles corresponding to a plurality of identities; comparing the generated profile with one or more of the stored profiles; determining whether the generated profile matches a stored profile, from the repository of stored profiles, associated with the identity; and validating, conditional on the matching, the identity.

According to another disclosed embodiment, accessing the fingerprinting data includes querying the computing device from a resource external to the computing device.

According to another disclosed embodiment, accessing the fingerprinting data includes receiving the electronic file from the computing device.

According to another disclosed embodiment, the fingerprinting data comprises metadata of the electronic file.

According to another disclosed embodiment, the repository is a database external to the computing device.

According to another disclosed embodiment, the electronic file is at least one of: an image file, a video file, a sound file, or textual document.

According to another disclosed embodiment, the identity provides the electronic file as part of requesting access to a secure resource.

According to another disclosed embodiment, generating the profile for the electronic file includes generating a fingerprint for the electronic file that is computationally based on the diversity of different properties of the fingerprinting data.

According to another disclosed embodiment, the validating includes authenticating the identity.

According to another disclosed embodiment, the validating includes provisioning a credential for use by the identity in accessing a secure resource.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
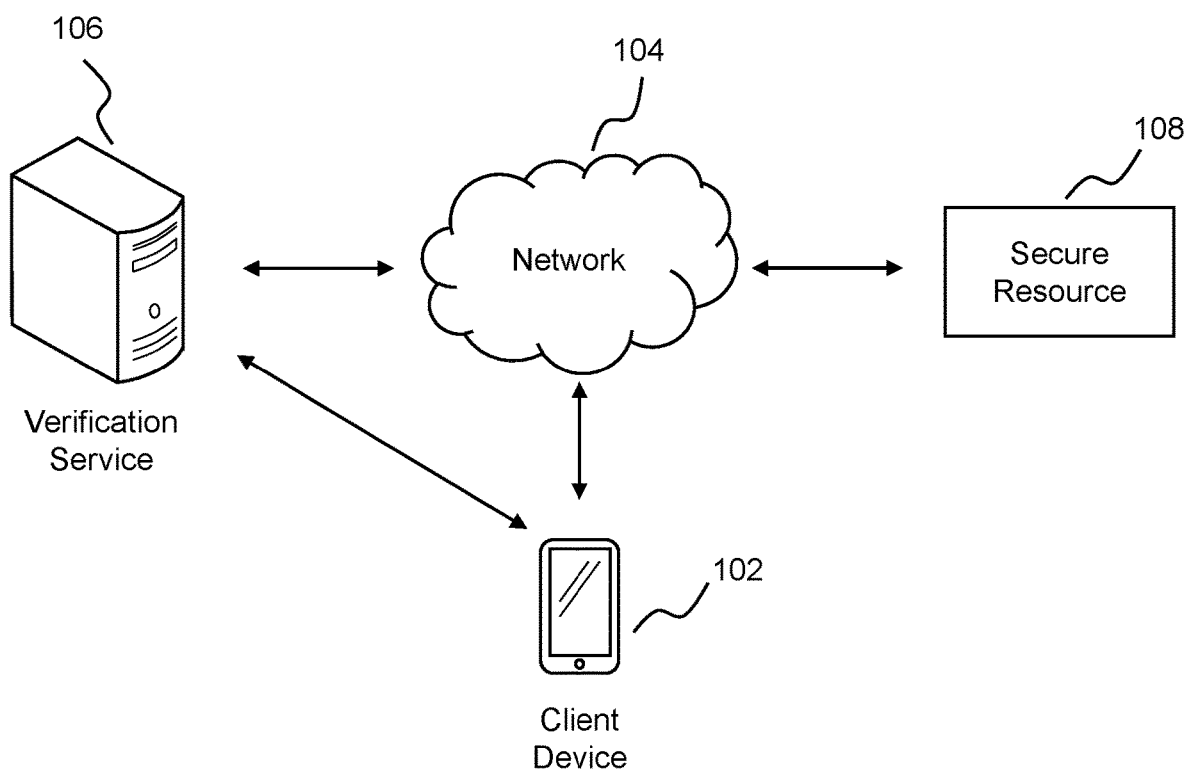
FIG. 1 is a block diagram of an exemplary system for verifying identities based on identity-inherent data that is inaccessible to the system, in accordance with disclosed embodiments.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques of secure authentication and data communications addressed herein overcome several important technical problems in the fields of identity security, data security, and communications security. Rather than relying on entities to securely store passwords or other identity-inherent information, the techniques discussed below allow a user to maintain control over their own identity-inherent data in novel ways to enhance identity authentication and data communication security. Users are able to securely verify themselves to remote systems based on unique personal data or unique metadata associated with electronic files on their devices, without requiring the transmission of personal or sensitive data. Similarly, applications are able to perform verifications of themselves based on their unique and inherent characteristics without sharing those characteristics externally.

For example, in some embodiments, to verify an identity associated with a user or an application, a system may receive, from a client device associated with the user or application, an encrypted token. The encrypted token may have been encrypted at the client device using a cryptographic key created at the client device based on identity-inherent data of the identity associated with the user or application. In some embodiments, the identity-inherent data of the identity is not itself received by the system, and thus the cryptographic key is accessible only to the client device associated with the user or application. The system may store the encrypted token in association with a hash of a decrypted version of the encrypted token. To verify the identity, the system may compare the stored hash with a created hash to determine whether to verify the identity.

In additional embodiments, the verification service may store unique profiles, or fingerprints, associated with particular electronic files or identities. The unique profiles may be based on unique metadata associated with files on user devices, such as electronic images, videos, sounds, textual documents, or other files. When an identity seeks access to a secure resource, a verification process may be performed to determine whether the unique metadata in a stored profile matches the unique metadata associated with an electronic file. If there is a match of the unique profiles, the identity may be permitted access to the secure resource, either with or without the provisioning of an access token or other access credential. On the other hand, if there is no match, the identity may be denied access to the secure resource, and optionally a control action (e.g., generating an alert, prompting for two-factor authentication, monitoring actions, etc.) may be performed for the identity.

As described further below, identity-inherent data may refer to data unique to the user or application. For example, with respect to a user, identity-inherent data may be biometric data, DNA or a unique genetic sequence, biological data, unique personal-inherent characteristics, private data, and the like. In some embodiments, an identity may be associated with a non-human entity such as, for example, a software application, computer hardware, computing device, artificial intelligence (AI) application, robotic device, and the like.

For a non-human entity, such as an application, disclosed systems and methods may be used to facilitate application anonymousness or to prevent further exploitation of cyber-attacks. For a non-human entity, identity-inherent data may be, for example, a unique attribute or characteristic of the application, such as a serial number (e.g., a motherboard serial number), unique metadata, a universally unique identifier, cookie, timestamp, hash function, MAC address, domain or network name, and the like, as well as combinations of such data.

In other embodiments, an application may be associated with application DNA or an application fingerprint based on, for example, factors including usage, users (both human and non-human), API calls, relationships and dependencies, stored files, runtime data, and the like. An application fingerprint may also identify an application or web-hosted resource by analyzing its framework, for example, by determining its architecture from information contained in an HTTP banner. Application DNA and/or an application fingerprint may uniquely identify an instance of an application such that it may operate as identity-inherent data.

Additionally, as discussed below, identity-inherent data (e.g., a unique file fingerprint) may be developed for electronic files. For example, when a user of a personal computing device captures an electronic image, video, sound, or other media file, or other types of files (e.g., textual or word processing files, presentation files, emails, etc.), unique metadata may be obtained from the file. The metadata may include one or more of hardware metadata (e.g., describing attributes of the device itself), presence metadata (e.g., describing the location or context of the file's creation), and software metadata (e.g., describing software settings on the device). Based on this unique metadata, unique profiles may be maintained, and used for verification purposes when identities seek access to secure resources.

To register an identity, a user's personal computing device may generate (e.g., randomly, semi-randomly, or uniquely, etc.) a cryptographic token representing or being associated with the user's identity. The token may then be encrypted using a cryptographic key based on the user's identity-inherent data or an application's identity-inherent data. The encrypted token and a hash of the decrypted token may be stored by a verification service associated with an entity owning or maintaining access-restricted resources. In some embodiments, a human or application identity's identity-inherent data is not sent or stored anywhere, thereby protecting the user from vulnerability associated with storing, by the client device or by a remote system, identity-inherent information. When the user wishes to verify their identity, for example, to gain access to an access-restricted resource, the user may prove their identity by providing a hash of the decrypted token to a verification service storing the encrypted token and a hash of the decrypted token. The verification service may then verify the identity based on whether the provided hashed decrypted token matches the hashed decrypted token stored by the verification service.

In some embodiments, the cryptographic key generated by the client device is used to encrypt the token using symmetric encryption (e.g., AES 256, RC4-6, DES, Blowfish, etc.). In some embodiments, the cryptographic key generated by the client device is used to encrypt the token using asymmetric encryption (e.g., RSA, DSA, PKCS, ECC, etc.).

In some embodiments, the verification service and/or the entity maintaining the access-restricted resources only stores a copy of the encrypted token and a hash of the decrypted token. Thus, these techniques do not require a user to provide an entity with identity-inherent data such as biometric data. According to these techniques, even if an attacker gains access to the verification service or to an entity's system, the attacker will still lack the valid user's identity-inherent information, and thus will be unable to complete the verification process. As discussed below, this verification process may be used in a variety of contexts, such as controlling secure access to applications, operating systems, computing resources, IoT devices, vehicles, buildings, rooms, transactions, and more.

Reference will now be made in detail to the disclosed embodiments, examples of which are illustrated in the accompanying drawings.

FIG. 1 illustrates an exemplary system 100 for verifying identities based on identity-inherent data that is inaccessible to the system (e.g., inaccessible outside of client device 102 itself). In addition, consistent with the discussion below regarding FIGS. 6 and 7, system 100 may be implemented to uniquely identify and validate identities based on electronic file fingerprints (e.g., based on files captured by or stored on client device 102).

As illustrated, client device 102 may communicate directly or via network 104 with verification service 106 to authenticate or verify an identity (e.g., user, application, etc.) associated with client device 102. As previously described, an identity may be associated with a human user or a non-human user (e.g., software application, computing device, etc.). Once the identity associated with client device 102 is verified, the identity may securely access an application or other resource available on client device 102 itself, on verification service 106 itself, or from a separate secure resource 108. As discussed above, the accessed resource may be an application, operating system, computing resource, IoT device, vehicle, building, room, transaction, or various other types of access-restricted resources.

In various embodiments, client device 102 may be a computing device with hardware and software configured to communicate over a network (e.g., network 104) or locally with verification service 106 and/or secure resource 108. For example, client device 102 may be a handheld device (e.g., a mobile phone, a tablet, or a notebook), a wearable device (e.g., a smart watch, smart jewelry, an implantable device, a fitness tracker, smart clothing, a head-mounted display, etc.), an IoT device (e.g., smart home device, industrial device, etc.), personal computer (e.g., a desktop or laptop), or various other devices capable of processing and/or receiving data. Exemplary components of client device 102 are further discussed below in connection with FIG. 2.

Verification service 106 may be implemented in a variety of arrangements. For example, in some embodiments verification service 106 may be part of a network system or device requiring verification of an identity associated with client device 102. In an enterprise network, for instance, verification service 106 may be a server, gateway, security application or agent, or other resource in the enterprise network that is deployed to require authentication or verification of an identity associated with client device 102 in order for the identity to access a secure application or other resource. Similarly, in a hotel, building security, or smart home environment, verification service 106 may be part of the hotel, building network, or smart home and configured to require authentication of the identity before access is permitted to a particular room or other area. In further embodiments, verification service 106 may be remotely situated from the service it is protecting. For example, verification service 106 may be a server, virtual machine (e.g., based on AWS™, Azure™, IBM Cloud™, etc.), container instance (e.g., Docker™ container, Java™ container, Windows Server™ container, etc.), or other virtualized instance. Exemplary components of verification service 106 are further discussed below in connection with FIG. 2.

In some embodiments, client device 102 communicates directly with verification service 106. For example, such direct communications may be short-range wireless communications (e.g., NFC, RFID, Bluetooth™, Bluetooth™ low energy, infrared, etc.). In other embodiments, such direct communications may include audible communications (e.g., based on a loudspeaker and microphone), light-based communications, vibration-based communications, or other types of local and wireless communications. In other embodiments, such direct communications may be wired (as opposed to wireless) communications (e.g., USB, Ethernet, Firewire, eSATA, etc.).

In some embodiments, client device 102 communicates indirectly with verification service 106 via network 104. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth™, infrared, etc.), or various other types of network communications. In some embodiments, the communications may take place across two or more of these forms of networks and protocols. Like the direct communications noted above, communications between client device 102 and verification service 106 via network 104 may involve cryptographic keys and tokens, as well as other communications.

Once an identity associated with client device 102 has been verified, as discussed further below, the identity may be authorized to access a secure application or other secure resource (e.g., resource 108). For example, in some embodiments a secure application (e.g., resource 108) may be unlocked or made accessible on client device 102 itself, or from verification service 106 itself. In other embodiments, upon verification of the identity, a secure application or resource may be made accessible from a separate system, such as secure resource 108. Secure resource 108 may be, for example, a secure application hosted in an on-premises or cloud-based network (e.g., an operating system, a human resources application, financial application, secure database, source code repository, customer list, etc.). Further, secure resource 108 may be a physical location, such as a hotel room, office room, office entrance, conference room, parking garage, etc. In additional embodiments, secure resource 108 may be an IoT device, such as a network-connected vehicle, a smart home appliance, a network-based sensor, robotic device, etc.

Figure 2:
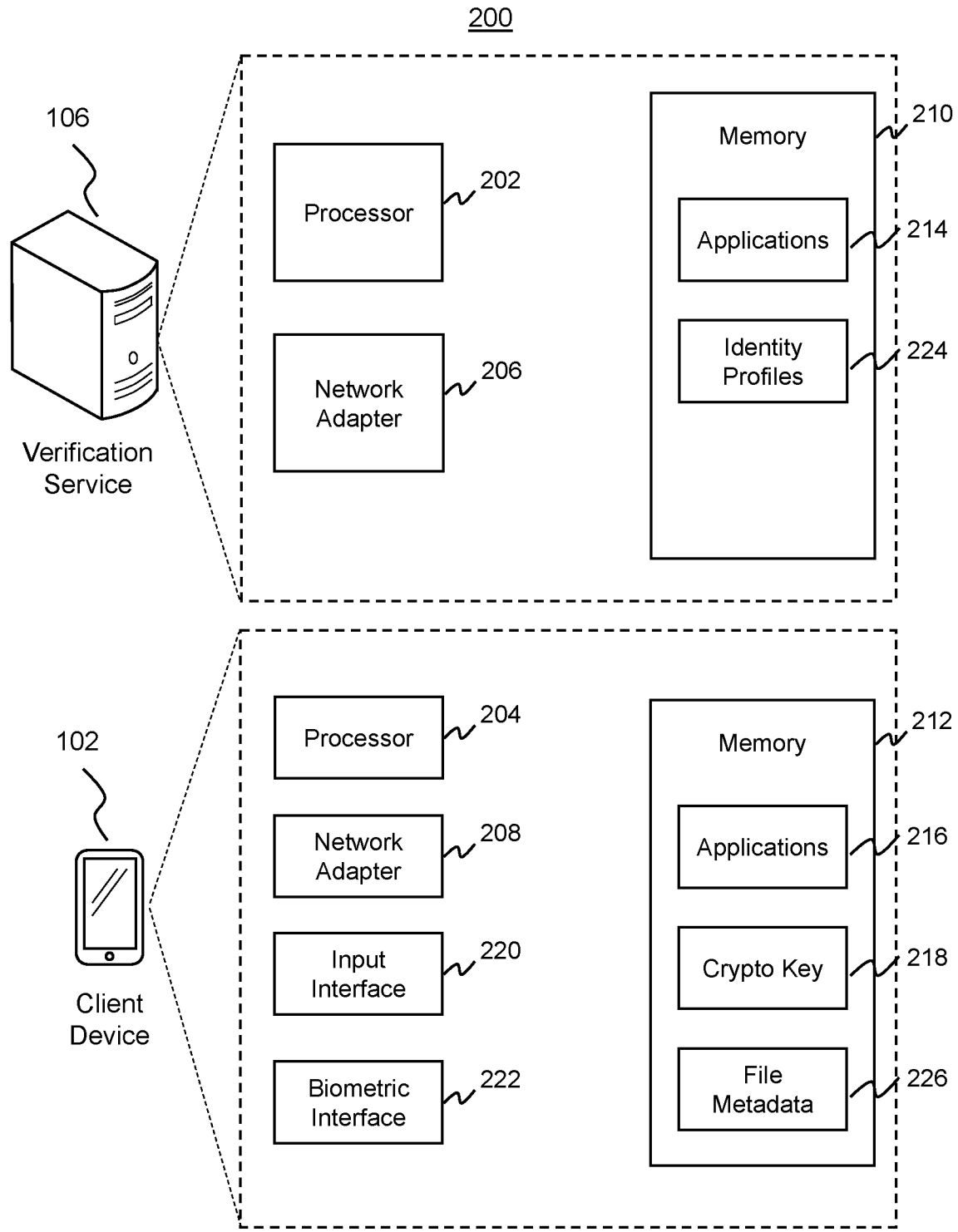
FIG. 2 is a block diagram of an exemplary system including a verification service and a personal computing device, in accordance with disclosed embodiments.

FIG. 2 is a block diagram of an exemplary system 200 including a verification service 106 and a client device 102. FIG. 2 illustrates exemplary components of verification service 106 and client device 102. Not all of the illustrated components are required to implement the functionality discussed below, and additional components may be added consistent with the discussed functionality as well.

As illustrated, verification service 106 and client device 102 may each include components such as processor 202/204. Processor (or processors) 202/204 may include one or more data or software processing devices. For example, processor 202/204 may take the form of, but is not limited to, a microprocessor, embedded processor, or the like, or may be integrated in a system on a chip (SoC). Furthermore, according to some embodiments, processor 202/204 may be from the family of processors manufactured by Intel®, AMD®, Qualcomm®, Apple®, NVIDIA®, or the like. Processor 202/204 may also be based on the ARM architecture, a mobile processor, or a graphics processing unit, etc. In some use cases, processor 202 may be a server processor while processor 204 may be a mobile device processor. The disclosed embodiments are not limited to any particular type of processor configured in verification service 106 or client device 102.

Verification service 106 and client device 102 may also each include a network adapter 206/208. Network adapters 206/208 may include one or more network interfaces or communication devices (e.g., Ethernet, cellular, WiFi, Bluetooth®, RFID, NFC, RF, infrared, etc.) to communicate with each other as well as other machines and devices.

Further, verification service 106 and client device 102 may each include one or more memories 210/212. Memory (or memories) 210/212 may include one or more storage devices or media configured to store instructions used by processors 202/204, respectively, to perform functions related to the disclosed embodiments. Memories 210/212 may be configured to store software instructions, such as programs, that perform one or more operations when executed by the processor 202/204 to verify an identity of client device 102, as discussed in connection with FIGS. 3, 4, 5, 6, and 7 below. The disclosed embodiments are not limited to particular software types or devices configured to perform dedicated tasks. For example, memories 210/212 may store a single program, such as a user-level application, that performs the functions of the disclosed embodiments, or may comprise multiple software programs. Additionally, the processor 202/204 may in some embodiments execute one or more programs (or portions thereof). Furthermore, the memories 210/212 may include one or more storage devices or media configured to store data for use by the programs. In some cases, memory 212 of client device 102 may be a secure mobile memory environment (e.g., ARM TrustZone™, Apple Secure Enclave™, Google Titan M™, Android Trusted Execution Environment™, etc.). In such embodiments, the secure memory environment may also have a separate secure processor for performing some or all of the functionality discussed below.

Memories 210/212 may also be configured to store executable applications or code 214/216. For example, verification service 106 may execute applications 214 configured to perform the functionality of FIGS. 3, 4, 5, 6, and 7 discussed below, as well as other applications. Similarly, client device 102 may execute applications 216 to participate in the functionality of FIGS. 3, 4, 5, 6, and 7 as well. In some embodiments, memory 212 may include cryptographic keys 218 and/or applications 216 for generating cryptographic keys 218. For example, in embodiments utilizing symmetric cryptographic keys, the symmetric keys may be generated using algorithms such as Twofish, DES, Blowfish, AES, Serpent, etc. In embodiments utilizing asymmetric keys, the keys may be generated using algorithms such as RSA, Transport Layer Security (TLS), S/MIME, PGP, GPG, or various other algorithms. In some embodiments, as discussed further below, client device 102 may generate the cryptographic keys based on identity-inherent data associated with an identity. The cryptographic keys 218 may be used to encrypt a token associated with the identity (e.g., randomly generated, semi-randomly generated, a UUID, a GUID, etc.). In some embodiments, applications 216 may be configured to randomly generate one or more such tokens. Client device 102 may generate a token and a cryptographic key based on identity-inherent data. Client device 102 (e.g., via application 216) may encrypt the token using the generated cryptographic key and send the encrypted token to verification service 106. Consistent with embodiments below, this may occur during a registration phase for the identity.

Verification service 106 may store identities' encrypted tokens in a secure database or vault. In some embodiments, applications 214 may be configured to receive a decrypted token from client device 102, and generate and store a hash of the received decrypted token. Alternatively, in some embodiments, rather than receive the decrypted token and generate its hash, verification service 106 may receive the hash itself from the client device 102 (e.g., as generated by client device 102).

Client device 102 may have an input interface 220 configured to receive a variety of types of user input. For example, input interface 220 may enable a user of personal computing device 102 to enter alphanumeric input, control a cursor, or provide touchscreen control (e.g., via a keyboard, mouse, touchscreen interface, stylus, pen, etc.) for interacting with applications 216. Additionally, input interface 220 may in some embodiments include a microphone, vibration sensor, light sensor, optical scanning device, gyroscope, accelerometer, or various other types of sensors. Consistent with the embodiments discussed below, input interface 220 may enable client device 102 to detect and/or read (e.g., optically scan, audibly pick up, receive, etc.) identity-inherent information from the user. In some embodiments, when the identity is associated with a non-human user (e.g., an application or machine), input interface 220 may be configured to detect or receive identity-inherent information associated with the application or machine.

In addition, client device 102 may include biometric interface 222. Biometric interface 222 may be configured to detect or scan a variety of types of physical or biological traits of a user, such as a fingerprint, retina, face, voice, hair follicle, heart rate pattern, walking or stepping pattern, or more. Biometric interface 222 may be, in some embodiments, configured by a user of client device 102 as part of an initial device configuration for client device 102. In other embodiments, biometric interface 222 may be configured after initialization (e.g., by an administrator, or as part of a process of installing a security application on client device 102 configured to implement the verification techniques discussed below). As discussed below, biometric interface 222 (alone or in conjunction with an application 216) may be used to generate a cryptographic key 218 (e.g., private key or symmetric key) that is used to encrypt a cryptographic token generated by applications 216. Memory 212 may store the encrypted token(s), either long-term or short-term. Further, memory 212 may store (long-term or short-term) the user's biometric or other identity-inherent data in memory 212 for purposes of encrypting the token and later participating in the verification process with verification service 106.

As shown in FIG. 2, verification service 106 may also store in memory 210 (or externally, such as in a separate database) identity profiles 224. Consistent with the discussion below, identity profiles 224 may represent unique metadata groupings associated with particular electronic files, computing devices, or identities. For example, when computing devices (e.g., client device 102) send electronic files (e.g., images, videos, sounds, textual documents, etc.) to verification service 106, verification service 106 may parse the metadata of the files and store the metadata in identity profiles 224. The metadata may be stored in a manner that is linked (e.g., logically linked) to particular files (e.g., based on file name), to particular devices (e.g., based on device identifiers, MAC addresses, etc.), or to particular identities (e.g., based on user name, account name, IP address, unique identifier, etc.). In some embodiments, verification service 106 periodically queries client device 102 to send current or updated versions of electronic files, so that verification service 106 can maintain identity profiles 224 in an up-to-date manner. In further embodiments, verification service 106 may obtain electronic files from client device 102 during a registration process (e.g., registering client device 102 itself or an associated identity) to verification service 106. In that event, verification service 106 may then parse the metadata from the files, and create (or update) identity profiles 224.

Client 102 may further include file metadata 226 in memory 212. In some embodiments, file metadata 226 may be stored in a discrete file in memory 212 that is separate from the electronic file it describes or pertains to. Such a file may be transmitted to verification service 106 as a discrete metadata file. Alternatively, in some embodiments file metadata 226 is stored together with the electronic file it describes or pertains to. In that situation, client device 102 can send either the entire file (with its metadata 226) to verification service 106, or may first separate out the metadata 226 for sending separately to verification service 106. However the file metadata 226 is received at verification service 106, verification service 106 may include such data in identity profiles 224 corresponding to the identity or client device 102 that sent it.

Figure 3:
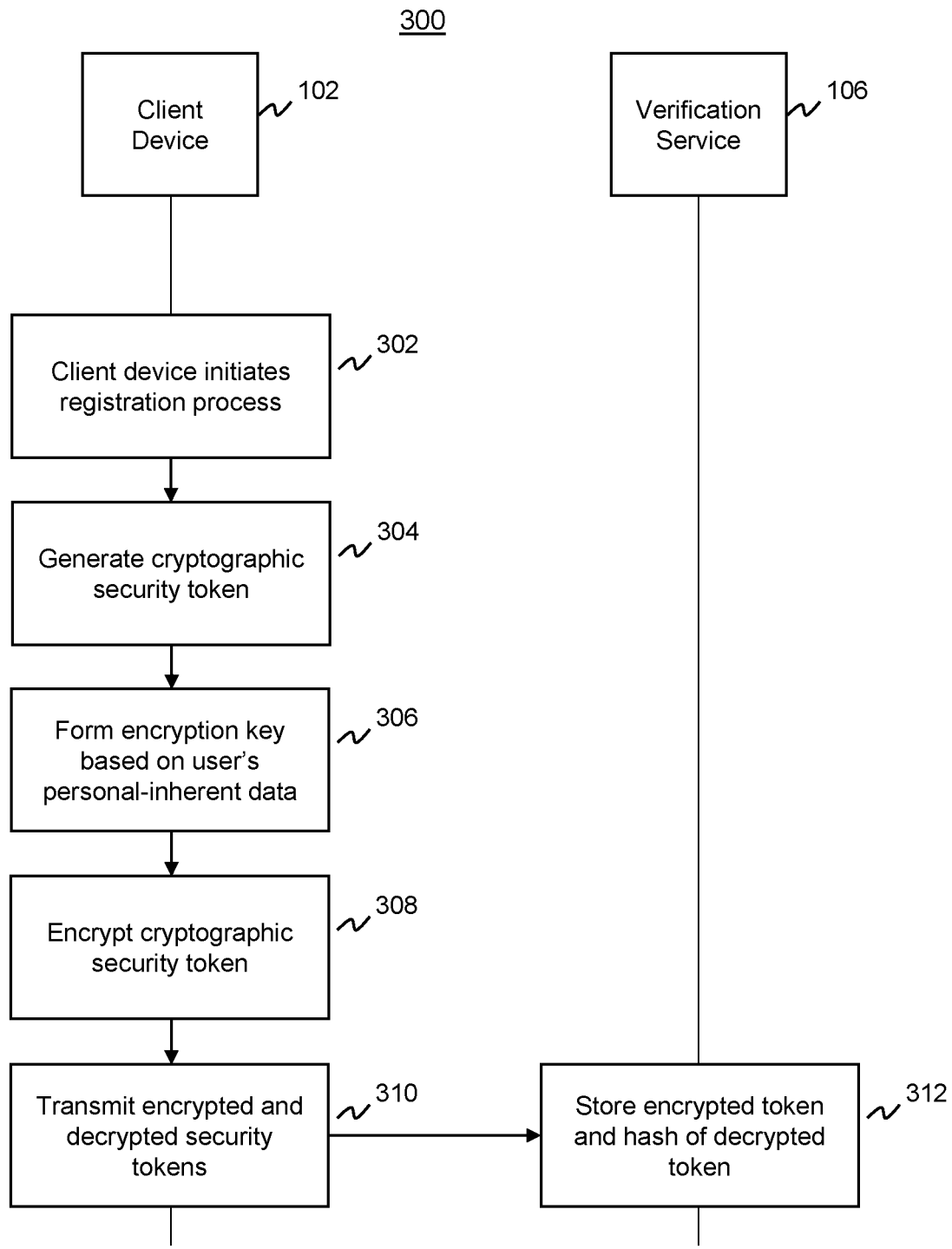
FIG. 3 is a flowchart of a user registration process, in accordance with disclosed embodiments.

FIG. 3 illustrates a block diagram of an exemplary process 300 for registering an identity associated with client device 102 with a verification service 106. At operation 302, client device 102 may initiate an initial registration phase (e.g., when client device 102 is first initialized, or when a security application is installed for performing the functionality discussed below), or client device 102 may initiate the registration phase in response to input received from a user, e.g., via input interface 220. Alternatively, in some embodiments verification service 106 may initiate the registration process. For example, verification service 106 may begin the registration of the identity associated with client device 102 upon detecting the identity or client device 102, upon detecting a request for access to a secure resource by the identity or client device 102, etc.

At operation 304, in response to the client device 102 (or verification service 106) initiating the registration process 300, client device 102 may generate a cryptographic token. For example, applications 216 may randomly or semi-randomly generate a token. In some embodiments, the token may be sufficiently complex so as to prevent attackers from using brute-force methods to guess the token. For example, the token may be a UUID or GUID, or other unique data or alphanumeric string. In some embodiments, client devices 102 are configured to periodically refresh their tokens. For example, every hour, day, week, or month client devices 102 may be configured to generate a new token, encrypt the token as discussed below, and perform the registration process 300.

At operation 306, client device 102 may receive or detect identity-inherent data via input interface 220 or biometric interface 222, or directly from an application 216, and generate an encryption key based on the received input. For example, a user may input, via a keypad or touchscreen interface, a unique personal attribute or data value, or biometric interface 222 may receive a fingerprint, retina scan, or other biometric or physical attribute. Client device 102 may then use the identity-inherent information to generate an encryption key unique to the identity. In some embodiments, client device 102 may prompt a user to perform a biometric verification on client device 102 or to provide biometric information to client device 102. Alternatively, client device 102 may access a result of a biometric verification that the user of client device 102 has already performed (e.g., as part of unlocking client device 102).

In some embodiments, biometric information may vary over time or may vary depending on the user's placement with respect to a sensor, camera, or microphone of the client device 102 resulting in a false rejection. For example, biometric interface 102 may receive fingerprint data from a fingerprint sensor. At a later time, the user may attempt to verify his identity using fingerprint data, but may change the orientation or angle of his finger with respect to the fingerprint sensor or there may be debris on the sensor or on the user's finger thereby obstructing the sensor from accurately detecting the user's fingerprint. The above situations may result in a sensor obtaining fingerprint data (or other identity unique data) that changes (even if slightly) over time.

Thus, in some embodiments, to account for noisy or varied data, client device 102 may accept biometric data that matches stored biometric data within a predetermined threshold or percentage. In some embodiments, during the registration process 300, client device 102 may collect several measurements of a biometric measurement, e.g., fingerprint, retina scan, facial recognition. In other embodiments, the client device 102 may prompt a user to reposition himself with respect to the sensor (e.g., a sensor, camera, microphone, etc. of biometric interface 222) and repeat the measurement. Client device 102 may store, e.g., in memory 214, an average of the measurements or an average and an acceptable margin of error or deviation. Thus, when the user provides a subsequent biometric for verification, the detected biometric information may be considered a match if it varies within a predetermined, acceptable threshold. In other techniques, the detected identity-inherent data (e.g., from biometric interface 222) may be normalized. For example, when biometric or biological data is expressed numerically (e.g., quantifying or measuring physical attributes of a user), the numerical data may be rounded up or down according to an order of magnitude. This technique may also result in repeatable measurements of identity-inherent data even if that data slightly changes over time.

In another embodiment, to account for error or fluctuations in biometric measurement, one or more error correction techniques may be applied to the biometric data prior to generating the key. For example, an error correction technique may be based on error patterns within biometric data or may be a standard error correcting code such as Hamming or Reed-Solomon. In yet another embodiment, one or more filters may be applied to a biometric scan to determine one or more features. A user may be prompted to submit a number of scans. The biometric data used in key generation may be based on the set of features appearing in at least a predetermined number of scans. In another embodiment, an acceptable threshold for matching stored biometric data with detected biometric data may be based on the Euclidean distance between feature vectors associated with each of the biometric data. Feature vectors may be determined based on an analysis of the biometric data, e.g., based on a fingerprint or iris scan. Other methods of correcting for measurement noise and/or error may be implemented. Additionally, some embodiments may implement one or more methods for normalizing biologic and/or biometric data to ensure measurement repeatability.

At operation 308, client device 102 may use the generated encryption key to encrypt the token generated at operation 304. In some embodiments, client device 102 may also generate a decrypted token. Client device 102 may store the encrypted and decrypted tokens in a memory of client device 102, e.g., memory 214. At operation 310, client device 102 may transmit the encrypted token, for example, via network 104 or locally, to verification service 106. In some embodiments, the encrypted and decrypted tokens may be transmitted to verification service 106 via an encrypted communication channel, e.g. a transport layer security (TLS) communication. At operation 312, verification service 106 may store the received tokens, for example, in memory 212 or other secure database or datastore. As noted above, in some embodiments client 102 may also provide to verification service 106 a hash of the decrypted (e.g., original) token.

In some embodiments, verification service 106 may also receive and store a user ID of client device 102 in association with the encrypted and/or decrypted tokens received at operation 312. The user ID may be a unique identifier associated with an identity of client device 102, or associated with client device 102 itself. The user ID may be, for example, an identity name, account name, IP address, MAC address, device serial number, Android™ Advertising ID, Mobile Device Identifier, etc.).

As discussed above, client device 102 may store in memory (in some cases, a secure mobile memory environment) a generated token and/or the encrypted version of the token, decrypted version of the token, and/or hash of the decrypted (e.g., original) token. Cryptographic key 218, may be used to encrypt and/or decrypt the generated token, as discussed above. For example, cryptographic key 218 may be based on raw data associated with the user's detected biometrics, a hash of that data, or other permutation of that data, consistent with the discussion above. Accordingly, once a user of client device 102 performs a biometric input (e.g., based on fingerprint, retina, face, voice, hair follicle, heart pattern, walking pattern, etc.), a result of that biometric input may be used to generate cryptographic key 218, thereby enabling client device 102 to decrypt the stored encrypted token. For example, raw data from the biometric input, a hash of that data, or other permutation of data resulting from a successful biometric verification may be used to decrypt the stored encrypted token. Similarly, when the identity-inherent data is based on an application (e.g., a unique serial number, metadata, code content, data content, etc.), that data may be used to form the cryptographic key that is used to encrypt and/or decrypt the token.

Figure 4:
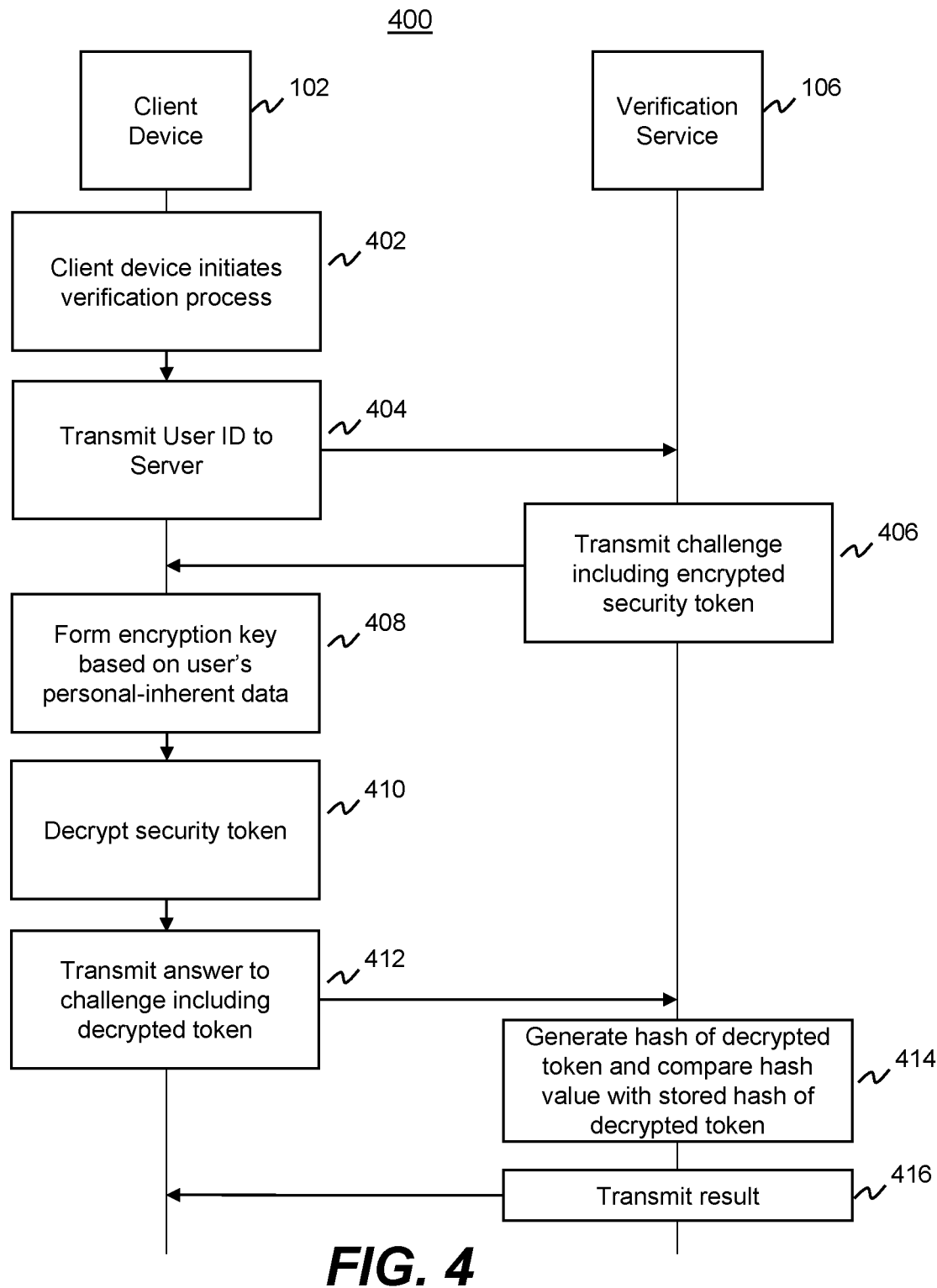
FIG. 4 is a flowchart of a user verification process, in accordance with disclosed embodiments.

FIG. 4 illustrates a block diagram of an exemplary process 400 for verifying an identity associated with client device 102 with a verification service 106. At operation 402, client device 102 may initiate the verification process. Alternatively, process 400 may be initiated by verification service 106 (e.g., upon detecting client device 102 or an associated identity, upon detecting a request for access to a secure resource, etc.). In some embodiments, the client device 102 may initiate the verification process in response to input received from a user, e.g., via input interface 220, indicating the user is requesting access to an access-restricted resource. At operation 402, to request access to a secure resource, a user may possibly provide, via input interface 220, a user ID, email address, telephone number, or other unique identifier associated with the identity. Alternatively, the user provides none of these forms of credential data. Instead, verification service 106 may identity the identity or client device 102 by an IP address, MAC address, cookie, or other data.

At operation 404, client device 102 may transmit the user ID, e.g., via network 104, or possibly no user-input data, to verification service 106. In response, at operation 406, verification service 106 may transmit a challenge or prompt to client device 102. The challenge or prompt may include an encrypted token, e.g., the encrypted token transmitted to verification service 106 from client device 102 during registration process 300.

In response to the received challenge, at operation 408, client device 102 may prompt the user or client device 102 itself to provide identity-inherent information, e.g., via biometric interface 222 or directly from an application 216. At operation 408, client device 102 may generate a cryptographic key based on the detected biometric data, or may retrieve a previously created cryptographic key (e.g., from key storage 218). The cryptographic key may be generated using the same algorithm or method as inn process 300.

At operation 410, client device 102 may decrypt the encrypted token received from verification service 106 using the generated (or retrieved) cryptographic key. At operation 412, client device 102 may transmit the decrypted key, via TLS or other secure communication, to verification service 106. Notably, the user's or computing device 102's identity-inherent data need not be transmitted outside of computing device 102 in this technique. While the identity-inherent (e.g., unique personal, biological, or application) data is used to verify the identity by decrypting the token, the identity-inherent data is securely maintained on the client device 102 itself.

At operation 414, verification service 106 may receive the decrypted token from client device 102 and generate a hash of the decrypted token. Alternatively, verification service 106 may receive the hash itself from client device 102. Verification service 106 may use the same method to generate a hash of the stored decrypted token. Verification service 106 may compare the hash of the received decrypted token and the hash of the stored decrypted token. If the hash values match, the identity is verified. If the hash values do not match, the identity is not verified. At operation 416, verification service 106 transmits the result of the comparison, or a prompt based on the comparison, to client device 102, thereby either allowing or denying access to an access-restricted resource depending on whether the identity is verified or not verified, respectively.

As previously discussed, biometric information input by the user may vary over time. Thus, subsequent biometric information may be different from the biometric information used to generate the cryptographic key in process 300, which could result in the identity not being verified in process 400 because the hash values of the key decrypted by client device 102 and the key decrypted by the verification service 106 may not match. To mitigate this possibility, client device 102 may prompt the user to provide a biometric measurement several times, as described with reference to FIG. 3. An average of the detected biometric data may be used in generating the cryptographic key in both processes 300 and 400. In another embodiment, an identity may be verified, for example, if the hashed values fall within a predetermined threshold range of each other. To determine the threshold, in some embodiments, client device 102 may generate cryptographic keys for an average of the detected biometric information and for an upper and lower bound, e.g., the average plus/minus one standard deviation, etc. Client device 102 may generate three encrypted tokens based on the cryptographic keys and transmit the three tokens to verification service 106. Thus, during process 400, an identity may be verified if the hash value of the token decrypted by client device 102 falls within the range defined by hashed values of the decrypted tokens associated with the upper and lower bounds of the biometric data. Further, as discussed above, the quantitative representation of identity-inherent data may be normalized (e.g., rounded up or down) in order to make it repeatable over time. For example, if biometric data or application data slightly changes over time, by normalizing the quantitative representation of such data the changes may be factored out.

In another embodiment, verification process 400 may use asymmetric encryption, e.g., RSA encryption, thereby allowing the data exchange between client device 102 and verification service 106 to occur using end-to-end data encryption. In this embodiment, at 406, the verification service 106 may transmit a challenge including an RSA key-pair. In some embodiments, the RSA key-pair may be generated one time per challenge. Thus, verification service 106 may transmit the encrypted token and the RSA public key to the client device 102.

After decrypting the received token, as described with reference to 410, client device 102 may encrypt the decrypted token using the RSA public key and sends this encrypted token to verification service 216. Upon receiving the token from client device 102, verification service 106 may decrypt the received token using the RSA private key and verify the identity as described with respect to 414-416 of process 400.

Figure 5:
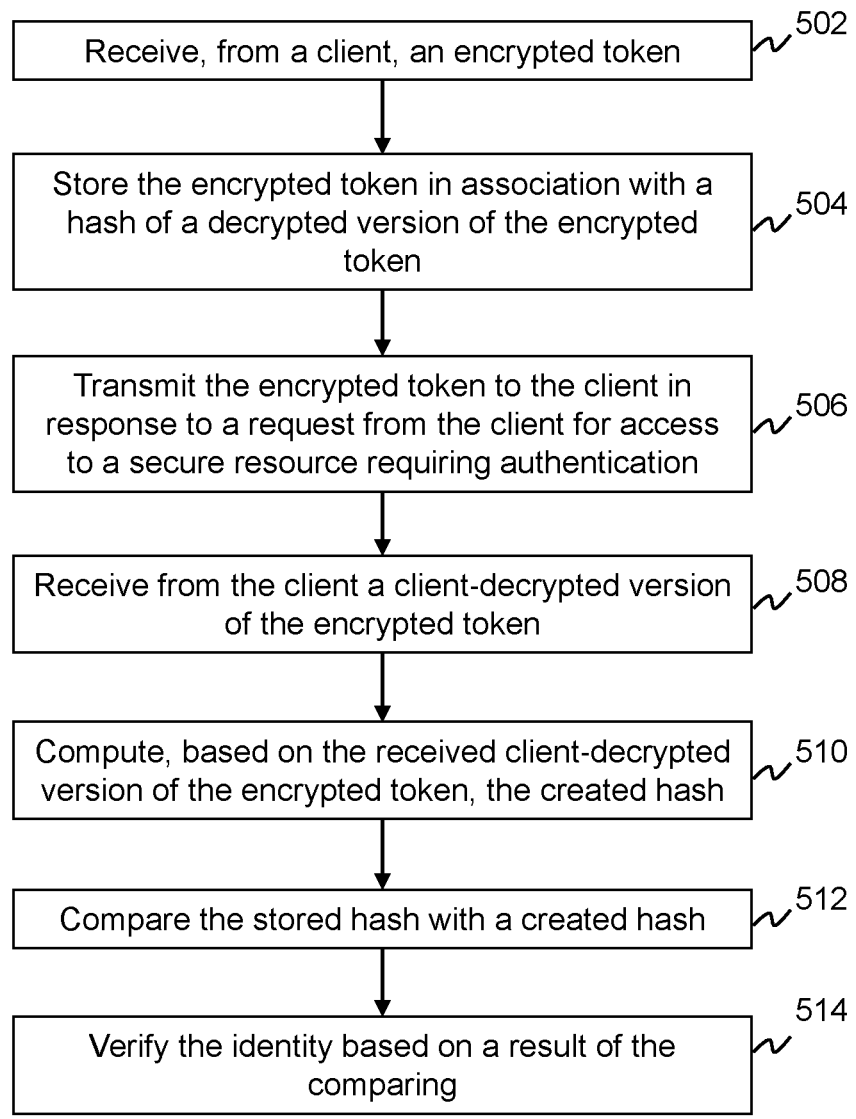
FIG. 5 is a flowchart of an exemplary method for verifying identities based on identity-inherent data that is inaccessible to the system, in accordance with disclosed embodiments.

FIG. 5 is a flowchart of an exemplary method 500 for verifying an identity based on identity-inherent data that a client does not share (or at least, is not required to share) externally, consistent with disclosed embodiments. Method 500 may be implemented in accordance with the systems of FIGS. 1 and 2. Consistent with embodiments described below, all or portions of method 500 may be implemented together with processes 300 and 400, as described in connection with FIGS. 3 and 4.

At step 502, a system, e.g., verification service 106, may receive, from a client, e.g., client device 102, an encrypted token. As previously described, the encrypted token may have been encrypted at the client using a cryptographic key, e.g., cryptographic key 218, created at the client based on identity-inherent data of an identity of the client. In some embodiments, the token is a random number or a universally unique identifier generated by client device 102. As described above, the identity-inherent data of the identity is not itself received by the system. Thus, even if verification service 106 is compromised or its data is exfiltrated, the identity-inherent data of the identity will not be accessible to unauthorized parties. In some embodiments, the cryptographic key is accessible only to the client. Further, in some embodiments, the cryptographic key based on identity-inherent data of the identity is a symmetric cryptographic key. Consistent with above embodiments, the identity-inherent data may be biological or biometric (e.g., based on a physical or biological characteristic of a user) or may be associated with an application itself (e.g., unique data or metadata of an application).

At step 504, verification service 106 may store the encrypted token in association with a hash of a decrypted version of the encrypted token. For example, the encrypted token and hash value may be stored in a secure database managed and maintained by verification service 106. As discussed above, verification service 106 may create the hash itself, or may receive the hash from client computing device 102.

At step 506, verification service 106 may transmit the encrypted token to the client computing device 102 in response to a request from the client for access to a secure resource requiring authentication. For example, the request may be based on the user attempting to unlock their computing device 102, log into an operating system, access an application, perform a transaction, open a door or access a room, enter a vehicle, etc. In some embodiments, the transmission may include a challenge and may be transmitted using a secure communication channel. In other embodiments, the transmission may include a public key of an RSA key-pair. For example, the transmitted encryption key may be a public key and the key corresponding to the transmitted encryption key may be a private key.

At step 508, in response to the challenge sent to client device 102 at step 506, verification service 106 may receive from the client a client-decrypted version of the encrypted token. The client-decrypted version of the encrypted token may have been decrypted by the client using the cryptographic key based on identity-inherent data of the identity of the client, for example, as described with reference to process 400. As previously described, the identity-inherent data of the identity may be at least one of: biometric data, biological data, personal verification data, or signature data associated with a human user or application.

At step 510, verification service 106 may compute a hash, based on the received client-decrypted version of the encrypted token. In some embodiments, verification service 106 may compute the stored hash of step 504. In some embodiments, step 510 may include decrypting, using a key corresponding to the transmitted encryption key, at least one of: a client-decrypted version of the encrypted token or a client-computed hash.

At step 512, the verification service 106 may compare the hash computed at step 510 with the hash stored by verification service 106 at step 504. For example, as part of a verification process for the identity, verification service 106 may compare a stored hash with at least one of: a system-computed hash based on the client-decrypted version of the encrypted token, or a client-created hash. Based on the result of the comparison, verification service 106 may determine whether to validate the identity (i.e., if the hashes match) or to not validate the identity (i.e., if the hashes do not match). In some embodiments, verification service 106 may transmit the outcome of the comparison to client device 102, thereby allowing or denying the user to access to an access-restricted resource. For example, upon the system, e.g., verification service 106, successfully verifying the identity, the client device 102 may obtain access to a secure resource requiring verification of the identity.

Figure 6:
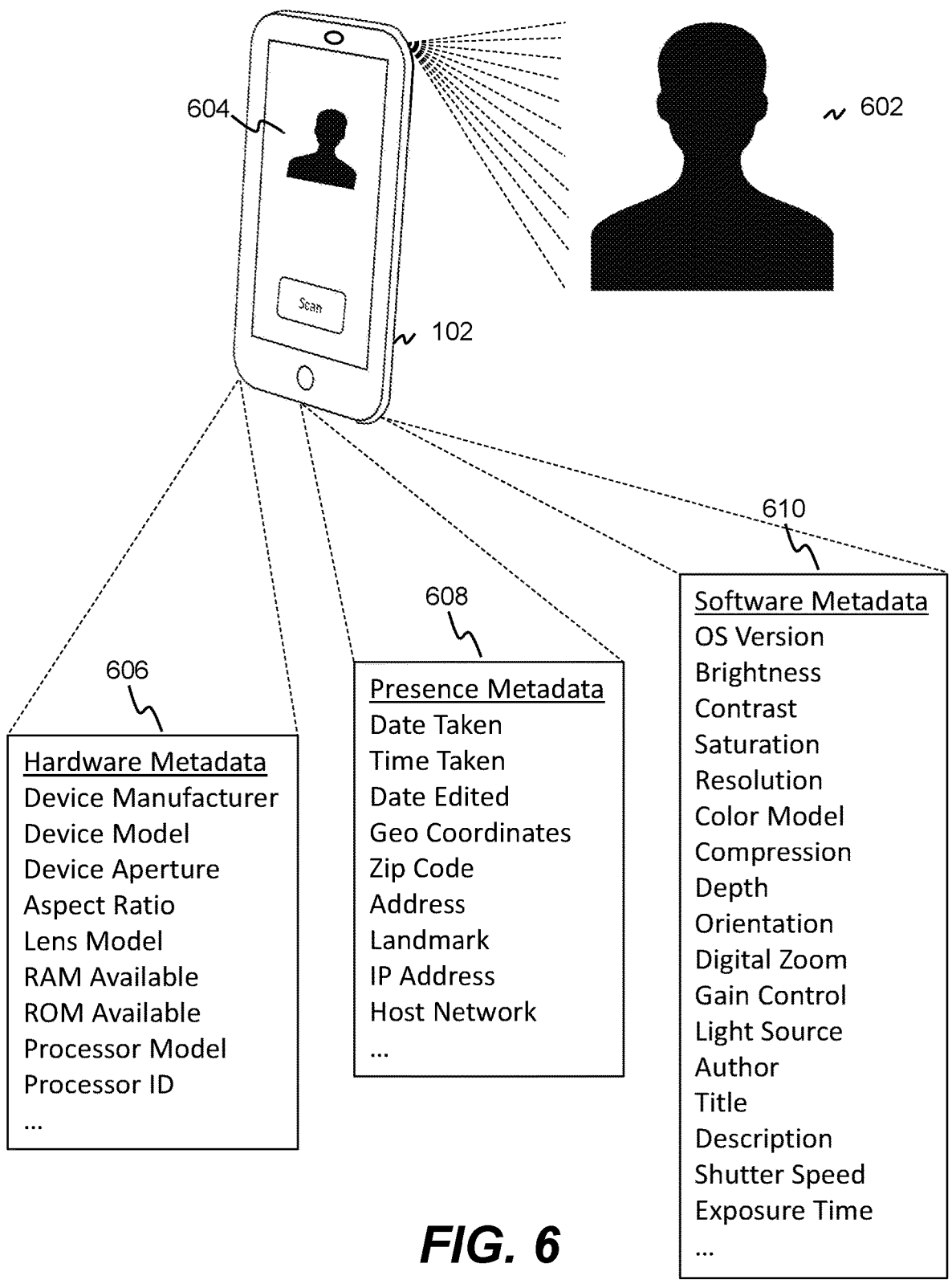
FIG. 6 is a block diagram of exemplary types of metadata that can be obtained to build a unique fingerprint for an electronic file, in accordance with disclosed embodiments.

FIG. 6 is a block diagram of system 600, illustrating exemplary types of metadata that can be obtained to build a unique fingerprint for an electronic file. In accordance with system 600, client device 102 may take an electronic photograph of a user 602, which is captured as an image file 604 on client device 102. This process may occur, for example, when users are prompted to provide an electronic image of themselves for authentication. Nevertheless, system 600 is not limited to that use case. System 600 may also involve client device 102 taking an electronic photograph of a non-human object, such as scenery, a computer screen, a QR code, a blank surface, an "imageless" photograph, or any other content (or lack of content).

In addition to image files, client device 102 may capture different types of electronic files in different embodiments. For example, input interface 220 of client device 102 may include a video capturing device, a sound capturing device, a vibration sensing device, a light sensing device, or various other types of sensors as discussed above in connection with FIG. 2. Further, using input interface 220, client device 102 may be configured to capture (e.g., download or receive) various types of electronic files from external sources such as images, videos, sounds, textual documents, emails, presentation documents, web page documents, and more. Consistent with the discussion below, each particular electronic file may have its own unique metadata, which may be based in part on hardware metadata 606, presence metadata 608, and/or software metadata 610.

Hardware metadata 606 may describe or pertain to attributes of client device 102 itself. For example, hardware metadata 606 may include parameters such as a manufacturer of client device 102, a device model, a physical imaging aperture (e.g., in a camera integrated into client device 102), a physically-constrained aspect ratio of a camera, a lens manufacturer or model, RAM space available, ROM space available, a processor model, a processor unique identifier, a gyroscope manufacturer or model, a sensor manufacturer or model, or various other hardware-based properties.

In some embodiments, hardware metadata 606 may be stored in the electronic file's metadata. For example, in FIG. 6, the captured electronic image 604 may have metadata containing hardware metadata 606. Alternatively, in some embodiments hardware metadata 606 may not be part of the captured image 604, but rather may be pulled from client device 102 itself. In that event, the hardware metadata 606 may be maintained separately from the image file 604, or may be merged with it.

Presence metadata 608 may describe or pertain to various attributes of the environment or context in which the electronic file 604 is captured. For example, presence metadata 608 may be based on parameters such as a date or time the file 604 was captured, a date or time the file 604 was last edited, geographic (e.g., latitude/longitude) coordinates, zip code, street address, landmark (e.g., a nearby identified landmark at the time file 604 was captured), IP address (e.g., of client device 102 or a connected device at the time file 604 was captured), a host network to which client device 102 was connected when file 604 was captured, or various other types of presence data. Like hardware metadata, some or all of presence metadata 608 may be captured originally with the capturing of the file 604, while in other embodiments some or all of the presence metadata 608 may be captured separately. If presence metadata 608 is captured separately from file 604, it may either be stored separately from file 604 or merged with the metadata of file 604.

Software metadata 610 may describe or pertain to a wide variety of software attributes or settings on client device 102. Examples of software metadata 610 include an operating system version, operating system patch data or identifier, application versions or patch identifiers, brightness settings, contrast settings, saturation settings, resolution settings, color model settings, compression settings, depth settings, orientation settings, digital zoom settings, gain control settings, light source settings, author data, title data, genre data, description data, shutter speed, exposure time, music ID3 metadata, image Exif or JFIF metadata, document Information Interchange Model (IIM) metadata, Extensible Metadata Platform (XMP) metadata, and many others. Like hardware metadata 606 and presence metadata 608, software metadata 610 may be captured originally with file 604 as part of file 604's metadata. Alternatively, some or all of software metadata 610 may be extracted from client device 102 separately from the capturing of file 604.

As discussed above, client device 102 may be configured to transmit metadata (e.g., hardware metadata 606, presence metadata 608, and/or software metadata 610) to verification service 106 periodically or as part of a registration process for client device 102. Alternatively, in some embodiments client device 102 may transmit actual electronic files to verification service 106, where the electronic files contain their accompanying metadata. In either technique, verification service 106 may include the received metadata in its memory or database for use in maintaining unique profiles for individual files, client devices 102, or identities.

The unique profiles for metadata may be developed in a variety of ways. For example, in some embodiments a table may be used to track the metadata, such as shown below in Table 1, which pertains to an example image file. While Table 1 includes only a limited number of metadata fields, for ease of illustration, in practice of course there may be many more such fields.

TABLE 1

| Metadata Parameter | Value |
| --- | --- |
| Device Model | iPhoneX ™ |
| Aperture | f/2.4 |
| Geo Coordinates | 40.054070, −75.398911 |
| OS Version | 5.1.1 |
| Date Taken | Dec. 25, 2019 12:13:34 |
| Resolution | 14.0 MegaPixels |
| EXIF Vesrion | 2.2.1 |
| ... | ... |

As discussed above, verification service 106 may be configured to store such metadata profile information, in association with a particular electronic file (e.g., the captured image), device (e.g., client device 102), or identity (e.g., the user or account that provided the metadata to verification service 106). Subsequently, as discussed further below, client device 102 may seek access to a secure resource 108, and may be prompted to engage in a process of verifying its metadata fingerprint. For example, this may involve client device 102 sending a file (e.g., image file) to verification service 106 including its metadata. Alternatively, client device 120 may transmit its metadata separate from the corresponding file.

When verification service 106 receives the metadata from client device 102, it may perform a comparison with its stored profiles to determine whether there is a match. For example, if verification service 106 stores metadata profiles in association with device identifiers or identity identifiers, verification service 106 may first look up the profile (or profiles) corresponding to the particular requesting device 102 or identity. Verification service 106 may then compare the metadata profile it has stored with the metadata that it received from client device 102. For example, Table 2 below illustrates a manner of comparing a stored metadata profile to received metadata. In the rightmost column, Comparison Result, a "1" may indicate a comparison match and a "0" may indicate a lack of a match.

TABLE 2

| Metadata Parameter | Stored Profile Value | Received Metadata Value | Comparison Result |
| --- | --- | --- | --- |
| Device Model | iPhoneX ™ | iPhoneX ™ | 1 |
| Aperture | f/2.4 | f.2.0 | 0 |
| Geo Coordinates | 40.054070, −75.398911 | 21.306944, −157.858337 | 0 |
| OS Version | 5.1.1 | 4.2.1 | 0 |
| Date Taken | Dec. 25, 2019 12:13:34 | Dec. 31, 2019 23:34:53 | 0 |
| Resolution | 14.0 MegaPixels | 12.0 MegaPixels | 0 |
| EXIF Version | 2.2.1 | 2.2.1 | 1 |
| ... | ... | ... | ... |

In the above example, only two metadata parameters are found to match (i.e., Device Model and EXIF Version). This may be an indication that the metadata profile stored by verification service 106 does not match the metadata existing on client device 102. In some embodiments, a threshold may be used to determine whether matching between a metadata profile and received metadata demonstrates a sufficient level of matching to affirmatively indicate a match. For example, in some embodiments, a count of the total number of matched parameters (e.g., in the above example, "2") may be compared to a threshold (e.g., "50"). Alternatively, a percentage of the matched attributes (e.g., 2 out of 50, or 4%) may be compared to a threshold percentage (e.g., 90% or 100%).

Further, in some embodiments as shown below in Table 3, weights may be applied to different metadata parameters, which can then be used in the matching process.

TABLE 3

| Comparison Result | Weight | Weighted Result |
| --- | --- | --- |
| 1 | 10 | 10 |
| 1 | 10 | 10 |
| 1 | 20 | 20 |
| 1 | 5 | 5 |
| 1 | 2 | 2 |
| 0 | 2 | 0 |
| 1 | 10 | 10 |
| ... | ... | ... |

In the above example, the weighted total of metadata attributes that are found to match is 57 out of a total possible number of 59. This degree of matching may be compared to a threshold level, either numerical (e.g., 57 being lower than a threshold of 58) or percentage (e.g., 96.6% being lower than 98.0%). In some embodiments, the weighting is used to apply more heavily to parameters that rarely change (e.g., device manufacturer) and less heavily to parameters that change frequently (e.g., RAM usage). Of course, other forms of metadata profiles and fingerprints are possible as well. For example, in some embodiments, a canvas fingerprinting technique may be applied to compare the developed metadata profiles to the received metadata from client devices 102.

Figure 7:
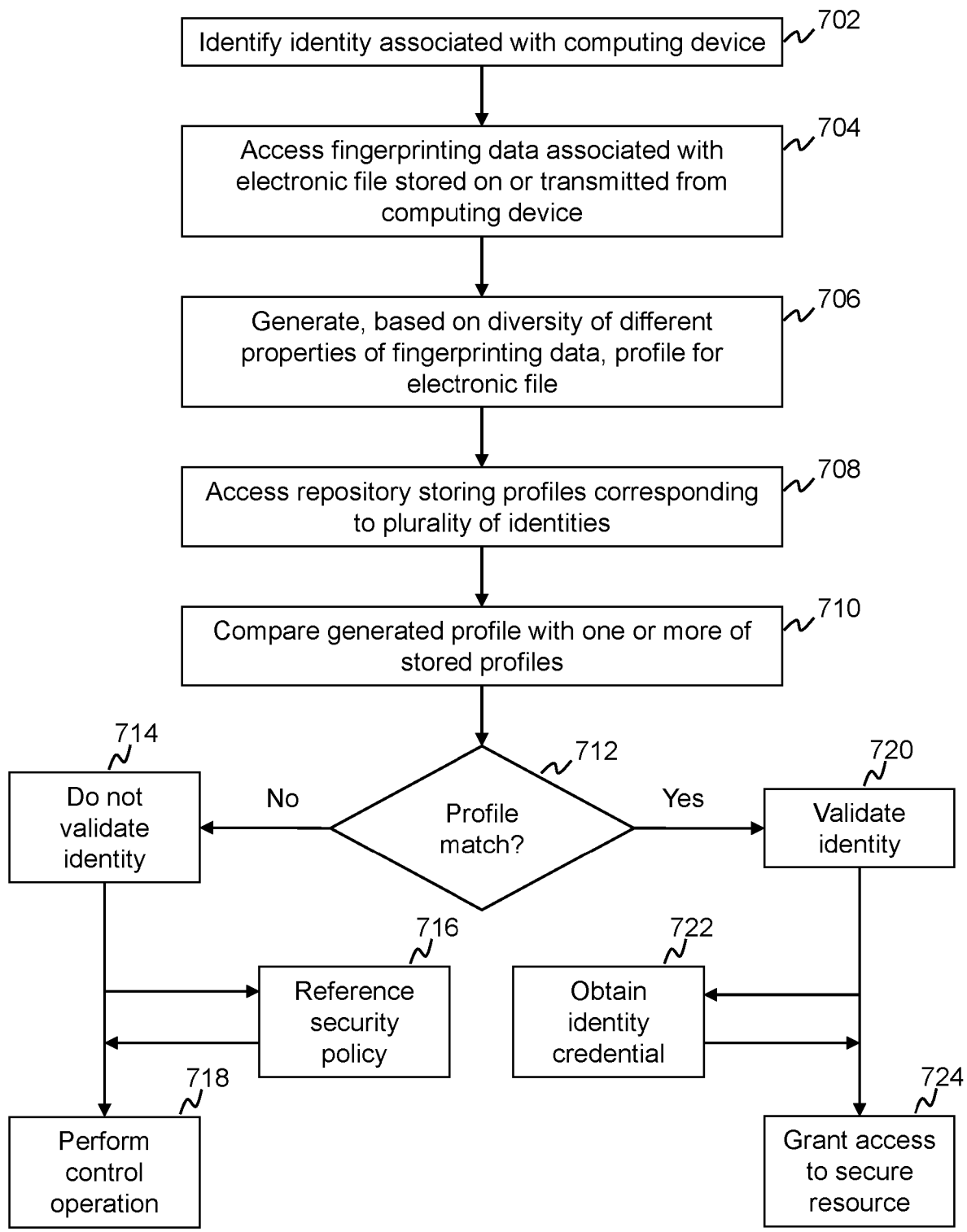
FIG. 7 is a flowchart of an exemplary method for uniquely identifying and validating identities based on electronic file fingerprints, in accordance with disclosed embodiments.

FIG. 7 is a flowchart of an exemplary method 700 for uniquely identifying and validating identities based on electronic file fingerprints. In accordance with above embodiments, process 700 may be implemented by verification service 106. Alternatively, in some embodiments secure resource 108 itself (e.g., the secure resource to which client device 102 is seeking access) may implement process 700.

In an operation 702, process 700 may include identifying an identity associated with a computing device 102. This may occur in several ways, as discussed above. For example, verification service 106 may detect the identity of computing device 102 when computing device 102 seeks access to a secure resource 108. The request for access may be received directly at verification service 106, or may be intercepted or rerouted to verification service 106. For example, secure resource 108 may be configured to route requests for access to verification service 107 before access is permitted. Further, a proxy server (not shown) may be configured to detect requests from client device 102 addressed to secure resource 108, and reroute them to verification service 106. Additionally, in some embodiments client device 102 may have a preexisting session open with verification service 106 (e.g., a browsing session, point-to-point session, etc.) and through that session verification service 106 may determine the identity of client device 102.

Consistent with the above discussion, the identity of client device 102 may be a variety of different types of identifying data. For example, the identity may be a user name, account name, unique identifier, device identifier, MAC address, etc. In some embodiments, the identity data may identify a user, while in other embodiments it may identify client device 102 itself, or an application running on client device 102.

Process 700 may also include an operation 704 of accessing fingerprinting data associated with an electronic file stored on or transmitted from the computing device. For example, as discussed above verification service 106 may be configured to maintain unique metadata or fingerprint profiles corresponding to one or more different identities. In some embodiments, these profiles are developed during a registration phase, where verification service 106 initially creates profiles for individual identities, files, or client devices 120. Further, in some embodiments verification service 106 may be configured to periodically query client devices 102 for updated metadata (or files containing metadata). Conversely, in some embodiments client devices 102 may be configured to periodically push their metadata (or files containing metadata) to verification service 106 for storage.

When verification service 106 receives new metadata (or a file containing metadata) from an identity, it may update its database with that new data. In some instances, this may include overwriting or deleting existing metadata stored in the database for the identity. Alternatively, without overwriting or deleting, historical versions of metadata may be stored along with current or new versions. As discussed above, the database of verification service 106 may be organized by client device 102 identifier, electronic file identifier, and/or identity identifiers. Accordingly, when in operation 702 a particular identity is identified, in operation 704 verification service 106 is able to use that identity data to query the database and retrieve the corresponding metadata profile.

In operation 706, process 700 may include generating, based on a diversity of different properties of the fingerprinting data, a profile for the electronic file. For example, if the electronic file is captured by the client device 102, a unique profile may be generated for the electronic file as discussed above. For example, a profile may be expressed in the format of Table 1, or in another format. In some embodiments the profile is generated locally on the client device 102 and transmitted to verification service 106. Alternatively, the electronic file (or its metadata) may be transmitted to verification service 106, and verification service 106 may generate the profile.

Once the metadata profile for the electronic file from client device 102 has been generated, verification service 106 may access its repository (e.g., memory or database) storing metadata profiles in operation 708. For example, as discussed above, verification service 106 may query its database based on client device 102 identifier, electronic file identifier, or identity identifier. Based on the look-up to the database, verification service 106 may identify one or several different metadata profiles. For example, individual identities of client devices 102 may have only one metadata profile, or may have several different metadata profiles.

In operation 710, process 700 may include comparing the generated profile with one or more of the stored profiles. For example, if only one profile is retrieved from the database in operation 708, the generated metadata profile may be compared with that one stored profile. Alternatively, if multiple metadata profiles are retrieved in operation 708, each may be compared with the generated metadata profile. The comparison may occur as described above, and may take several different forms. For example, in some embodiments the comparison may occur as discussed in connection with Tables 2 and/or 3, with or without using a weighting technique for certain metadata parameters. Of course, other metadata fingerprinting and comparison techniques are possible as well.

In operation 712, verification service 106 determines whether there is a match between a stored metadata profile and the generated metadata profile. For example, in some embodiments a perfect match (e.g., 100%) is required in operation 712. Alternatively, a less-than-perfect match may be required in operation 712, such as by using a threshold (e.g., $38/40$ factors matched, or 98% of factors matched, etc.).

If in operation 712 a match is not found, process 700 may proceed to operation 714 of determining not to validate the requesting identity. In some embodiments, this may further include performing a control operation in operation 718. For example, the particular control operation to implement in operation 718 may be determined by referencing a security policy in operation 716. According to the security policy, or without referring to such a policy, a control operation may include an action to control or monitor the identity or client device 102. For example, control actions may include denying the identity or client device 102 access to the secure resource 108, blacklisting the identity or client device 102, prompting the identity or client device 102 for additional authentication (e.g., second-factor authentication, biometric identification, username/password, etc.), monitoring actions of the identity or client device 102, recording actions of the identity or client device 102, disabling the client device 102, rotating or refreshing credentials (e.g., passwords, certificates, etc.) associated with the identity or client device 102, or various other control operations.

On the other hand, if in operation 712 there is determined to be a successful match between a stored metadata profile and a generated metadata profile, process 700 may continue to operation 720 of validating the identity. In some embodiments, process 700 may stop here and the identity or client device 102 may be permitted to access secure resource 108 (e.g., an access restricted web page, application, operating system, online or intranet portal, physical room or space, building, parking garage, IoT device, etc.). For example, the identity or client device 102 may be redirected by verification service 106 to secure resource 108. In some cases, that may involve verification service 106 or secure resource 108 establishing a secure connection (e.g., SSH connection, tunnel, HTTPS session, encrypted session, etc.) between client device 102 and secure resource 108. Client device 102 may then engage in a session with secure resource 108 in operation 724.

In some embodiments, process 700 further includes obtaining an identity credential for client device 102 in operation 722. This may involve, for example, verification service 106 retrieving from memory, or generating on demand, an authentication credential (e.g., token, certificate, password, key, etc.) for use by client device 102 in accessing secure resource 108. Alternatively, this may involve verification service 106 requiring one or more credentials for use by client device 102 from a credentials vault (e.g., Cyber-Ark™ vault). However the identity credential is obtained in operation 722, it may be either provided directly to client device 102 (e.g., transmitted to client device) or provisioned to secure resource 108 on behalf of client device 102 without actually sending a copy to client device 102.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for validating identities based on electronic file fingerprints, the operations comprising:
receiving an electronic registration file from a computing device associated with an identity, the computing device being configured to provide the electronic registration file independent of a request to access a secure resource from the computing device and independent of a query to provide the electronic registration file;
updating a stored profile associated with the identity based on the electronic registration file received from the computing device, the stored profile being included in a repository of stored profiles corresponding to a plurality of identities;
receiving, from the computing device, the request to access the secure resource;
identifying the identity associated with the computing device;
receiving, from the computing device, fingerprinting data associated with an electronic file stored on or transmitted from the computing device, wherein the fingerprinting data comprises one or more metadata attributes of the computing device, the metadata attributes being accessed separately from the electronic file;
generating, based on a diversity of different properties of the fingerprinting data, a profile for the electronic file comprising a subset of the one or more metadata attributes;
accessing the repository storing profiles;
comparing the generated profile with one or more of the stored profiles;
determining whether the generated profile matches the stored profile associated with the identity by comparing a degree of matching between the generated profile and the stored profile with a threshold;
validating the identity conditional on the degree of matching being above the threshold; and
granting, based on the validating, the request to access the secure resource.

2. The non-transitory computer readable medium of claim 1, wherein the identity is at least one of: a unique computing device, a unique user, or an account.

3. The non-transitory computer readable medium of claim 1, wherein the electronic file is an image file and the fingerprinting data comprises image metadata.

4. The non-transitory computer readable medium of claim 3, wherein the image file is an image of a user associated with the identity.

5. The non-transitory computer readable medium of claim 3, wherein the diversity of different properties of the fingerprinting data include at least one of: date data, device data, zoom data, software data, or location data.

6. The non-transitory computer readable medium of claim 1, wherein the identity provides the electronic file as part of requesting access to a secure resource.

7. The non-transitory computer readable medium of claim 1, wherein generating the profile for the electronic file includes generating a unique fingerprint for the electronic file that is computationally based on the diversity of different properties of the fingerprinting data.

8. The system of claim 1, wherein the validating includes authenticating the identity.

9. The non-transitory computer readable medium of claim 1, wherein the granting includes provisioning a credential for use by the identity in accessing the secure resource.

10. A computer-implemented method for uniquely identifying and validating identities based on electronic file fingerprints, the method comprising:
receiving an electronic registration file from a computing device associated with an identity, the computing device being configured to provide the electronic registration file independent of a request to access a secure resource from the computing device and independent of a query to provide the electronic registration file;
updating a stored profile associated with the identity based on the electronic registration file received from the computing device, the stored profile being included in a repository of stored profiles corresponding to a plurality of identities;
receiving, from the computing device, the request to access the secure resource;

identifying the identity associated with the computing device;

receiving, from the computing device, fingerprinting data associated with an electronic file stored on or transmitted from the computing device, wherein the fingerprinting data comprises one or more metadata attributes of the computing device, the metadata attributes being accessed separately from the electronic file;

generating, based on a diversity of different properties of the fingerprinting data, a profile for the electronic file comprising a subset of the one or more metadata attributes;

accessing the repository storing profiles;

comparing the generated profile with one or more of the stored profiles;

determining whether the generated profile matches the stored profile associated with the identity by comparing a degree of matching between the generated profile and a stored profile with a threshold;

validating, conditional on the degree of matching being above the threshold, the identity; and granting, based on the validating, the request to access the secure resource.

11. The computer-implemented method of claim 10, wherein accessing the fingerprinting data includes querying the computing device from a resource external to the computing device.

12. The computer-implemented method of claim 10, wherein accessing the fingerprinting data includes receiving the electronic file from the computing device.

13. The computer-implemented method of claim 10, wherein the fingerprinting data comprises metadata of the electronic file.

14. The computer-implemented method of claim 10, wherein the repository is a database external to the computing device.

15. The computer-implemented method of claim 10, wherein the electronic file is at least one of: an image file, a video file, a sound file, or textual document.

16. The computer-implemented method of claim 10, wherein the identity provides the electronic file as part of requesting access to a secure resource.

17. The computer-implemented method of claim 10, wherein generating the profile for the electronic file includes generating a fingerprint for the electronic file that is computationally based on the diversity of different properties of the fingerprinting data.

18. The computer-implemented method of claim 10, wherein the validating includes authenticating the identity.

19. The computer-implemented method of claim 10, wherein the granting includes provisioning a credential for use by the identity in accessing the secure resource.

\* \* \* \* \*